(12) United States Patent
Zamani et al.

(10) Patent No.: US 10,680,718 B2
(45) Date of Patent: Jun. 9, 2020

(54) TRELLIS BASED PROCESSING FOR ROBUST DIGITAL MULTIBAND TRANSMISSION

(71) Applicant: Huawei Technologies Co., Ltd., Shenzhen (CN)

(72) Inventors: Mahdi Zamani, San Diego, CA (US); Jeebak Mitra, Ottawa (CA); Hossein Najafi, Ottawa (CA); Zhuhong Zhang, Ottawa (CA); Chuandong Li, Ottawa (CA)

(73) Assignee: Huawei Technologies, Co., Ltd., Shenzhen (CN)

( * ) Notice: Subject to any disclaimer, the term of this patent is extended or adjusted under 35 U.S.C. 154(b) by 0 days.

(21) Appl. No.: 16/293,324

(22) Filed: Mar. 5, 2019

(65) Prior Publication Data

US 2019/0199443 A1  Jun. 27, 2019

Related U.S. Application Data

(63) Continuation of application No. PCT/CN2016/101503, filed on Oct. 8, 2016.

(51) Int. Cl.
*H04B 10/548* (2013.01)
*H04B 10/61* (2013.01)
*H04B 10/556* (2013.01)

(52) U.S. Cl.
CPC ......... *H04B 10/616* (2013.01); *H04B 10/548* (2013.01); *H04B 10/5561* (2013.01); *H04B 10/613* (2013.01); *H04B 10/614* (2013.01)

(58) Field of Classification Search
CPC combination set(s) only.
See application file for complete search history.

(56) References Cited

U.S. PATENT DOCUMENTS

| 6,430,401 | B1 * | 8/2002 | Lou | H04H 20/30 |
| | | | | 375/260 |
| 2005/0123028 | A1 * | 6/2005 | Cioffi | H04B 3/32 |
| | | | | 375/222 |
| 2012/0076192 | A1 * | 3/2012 | Nervig | H04L 25/03171 |
| | | | | 375/232 |
| 2013/0223550 | A1 * | 8/2013 | Fimoff | H04L 1/0045 |
| | | | | 375/261 |

(Continued)

FOREIGN PATENT DOCUMENTS

| CN | 105284065 A | 1/2016 |
| EP | 2538594 A2 | 12/2012 |
| WO | 2014147482 A1 | 9/2014 |

*Primary Examiner* — Omar S Ismail
(74) *Attorney, Agent, or Firm* — Slater Matsil, LLP

(57) ABSTRACT

Aspects of the present disclosure are directed in part to a receiver DSP unit including an equalization module. The equalization module includes a trellis-based equalization module that may utilize multiple trellis-based processors (TBP), which can each be individually adaptively configured for performing a trellis-based equalization. The design of the TBPs allows them to be configured for compensating a residual Inter-Symbol Interference (ISI) as well as compensating a residual Phase Noise (PN). ISI is an example of an additive impairment and PN is an example of a multiplicative impairment that communication systems, particularly high speed transmission systems such as coherent optical systems, can suffer from.

20 Claims, 12 Drawing Sheets

(56) References Cited

U.S. PATENT DOCUMENTS

2013/0339827 A1* 12/2013 Han ................. G11B 20/10046
714/799
2014/0289589 A1* 9/2014 Jia ........................... G06F 11/10
714/776
2014/0356003 A1 12/2014 Randel et al.

* cited by examiner

TRELLIS BASED PROCESSING FOR ROBUST DIGITAL MULTIBAND TRANSMISSION

CROSS-REFERENCE TO RELATED APPLICATIONS

This application is a continuation of PCT Application No. PCT/CN2016/101503, filed on Oct. 8, 2016, which application is hereby incorporated herein by reference in its entirety.

TECHNICAL FIELD

This application relates to optical transmission systems, and in particular to digital multi-band transmission systems.

BACKGROUND

Optical communication systems are widely used today for data communication. In addition to the transmitters and receivers in coherent optical communication systems, there may also be bandwidth limited optical components included in the transmission channel between the transmitter and receiver that cause inter-symbol interference impairments in the transmitted signal. The optical fiber used as the transmission channel to support high data rate transmissions may induce phase noise related impairments. Providing adequate compensation for these impairments is important for designing a robust receiver that is capable of recovering of the transmitted signals.

Digital Multi-band (DMB) transmission is a multiplexing technique that can provide a flexibility of transmission data rates for different signals being transmitted. DMB allow use of different Forward Error Correction (FEC) coding and modulation rates for different tones, provide rate variability through sub-carrier bandwidth variation and provide variable transmission bandwidth granularity by increasing or decreasing a number of tones being transmitted.

Because of the variability of transmission characteristics associated with DMB transmission, there may be benefit to emphasizing different types of compensation for different impairments that can dominate different bands of a multi-band signal.

SUMMARY

According to an embodiment of the disclosure there is provided a method for digitally processing an optical digital multi-band (DMB) signal comprising a set of frequency bands on a single carrier. The method involves digitally demultiplexing the DMB signal into respective digital signals on separate frequency bands of the set of frequency bands. Another step involves processing a digital signal on a first frequency band of the set of frequency bands to mitigate inter-symbol interference (ISI). A further step involves processing a digital signal on a second frequency band of the set of frequency bands to mitigate phase noise (PN).

According to another embodiment of the disclosure there is provided a signal processor for digitally processing a digital multi-band (DMB) signal comprising a set of frequency bands on a single carrier. The signal processor includes a digital demultiplexer for demultiplexing the DMB signal into respective digital signals on first and second separate frequency bands of the set of frequency bands. The signal processor also includes a plurality of trellis based processors (TBPs), each trellis based processor adaptively configurable for mitigating inter-symbol interference (ISI) or phase noise PN of the digital signals on one of the first and second frequency bands. The signal processor further includes a TBP mode selector adapted for configuring one or more TBPs to process the digital signals on the first or second frequency bands to mitigate one of the ISI or the PN.

According to another embodiment of the disclosure there is provided a receiver for receiving an optical multi-band (DMB) signal. The receiver includes a coherent detector for detecting the optical DMB signal, an analog to digital converter for converting the optical DMB signal detected by the coherent detector into a digital DMB signal comprising a set of frequency bands on a single carrier and a digital demultiplexer for demultiplexing the DMB signal into respective digital signals on first and second separate frequency bands of the set of frequency bands. The receiver also includes a plurality of trellis based processors (TBPs), each trellis based processor adaptively configurable for mitigating inter-symbol interference (ISI) or phase noise PN of the digital signals on one of the first and second frequency bands. The receiver further includes a TBP mode selector adapted for configuring one or more TBPs to process the digital signals on the first or second frequency bands to mitigate one of the ISI or the PN.

According to another embodiment of the disclosure there is provided a transmitter for transmitting an optical digital multi-band (DMB) signal. The transmitter includes a plurality of modulation mappers, each modulation mapper configured to transform a plurality of streams of symbols into frequency domain to provide corresponding digital signals on a set of frequency bands. The transmitter also includes a plurality of power allocators, each power allocator configured to allocate a transmit power to a digital signal on a corresponding frequency band of the set of frequency bands based on a modulation format of each stream of symbols. The transmitter further includes a plurality of frequency-domain pulse shaping filters, each frequency-domain pulse shaping filter configured to filter the digital signal on the corresponding frequency band of the set of frequency bands based on a modulation format of each stream of symbols.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF ILLUSTRATIVE EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

Disclosed herein are methods and apparatuses for mitigation of correlative additive and multiplicative noise in a Digital Multi-Band (DMB) communication system, particularly high speed transmission systems such as coherent optical systems.

Figure 1:
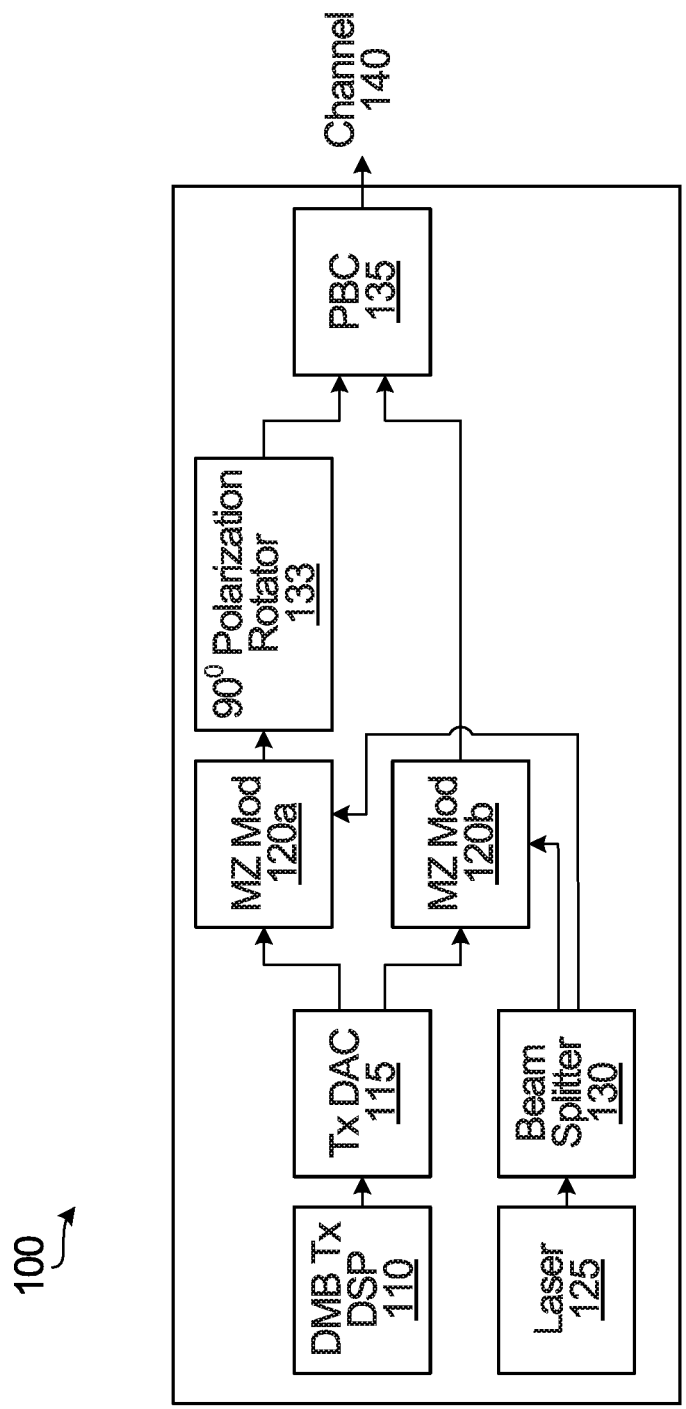
FIG. 1 is a block diagram of a coherent optical transmitter of an optical communication system.

FIG. 1 is an example of a coherent optical transmitter 100. The coherent optical transmitter 100 includes a Digital Multiband (DMB) transmitter digital signal processing (DSP) unit 110 that generates the DMB signal. The output of the DMB transmitter DSP unit 110 is provided to the digital to analog converter (DAC) 115 to convert the signal to an analog signal. The analog signal is provided to each of two Mach-Zehnder modulators 120a, 120b to transform the analog electrical signals into optical signals. Each of the two Mach-Zehnder modulators 120a, 120b is provided with an optical carrier. A laser 125 provides the optical carrier to a beam-splitter 130 that splits the beam and provides the optical carrier to each of the two Mach-Zehnder modulators 120a, 120b. The two Mach-Zehnder modulators 120a, 120b each modulate the optical carrier with the analog signal and provide the respective modulated signals. The output of Mach-Zehnder modulator 120a is polarization rotated by a 90° polarization rotator 133 to provide an output that is different than the polarization output from Mach-Zehnder modulator 120b. The output of the 90° polarization rotator 133 and the Mach-Zehnder modulator 120b are provided to a polarization beam combiner (PBC) 135. The output DMB transmission of the PBC 135 is transmitted on an optical channel 140.

The DMB transmitter DSP unit 110 may contain a forward error correction (FEC) encoder and a modulator. The modulator may be capable of Quadrature Phase Shift Keying (QPSK) or 8, 16, 32, or 64 quadrature amplitude modulation (QAM). The signal modulated by the modulator may be conditioned by a pulse shaping filter to better match the channel 140.

An example of a transmitted optical signal from the transmitter 100 may be transmitted over two orthogonal linear polarizations (X and Y), as shown in FIG. 1, with each polarization component having two orthogonal phase components (an in-phase I and a quadrature-phase Q). The four components have the same carrier frequency, which is determined by the laser 125.

The optical channel 140 is configured to transport the modulated signal from the transmitter 100 to a receiver (for example receiver 200 in FIG. 2), and may comprise fibers as well as other components such as optical filters and optical amplifiers. The optical channel 140 may comprise one or more cascaded wavelength-selective switches (WSSs) (not shown). The components of the optical channel 140 can introduce further undesired signal changes, such as chromatic dispersion (CD), nonlinear phase noise, polarization mode dispersion (PMD), polarization dependent loss (PDL) and/or gain, state-of-polarization (SOP) rotation, optical additive noise, optical multiplicative noise, or combinations thereof.

The DMB Tx DSP 110 may be implemented by a processor that executes instructions that cause the processor to perform the operations of the DMB Tx DSP 110. Alternatively, the DMB Tx DSP 110 may be implemented using dedicated integrated circuitry, such as an application specific integrated circuit (ASIC), a graphics processing unit (GPU), or a programmed field programmable gate array (FPGA) for performing the functions of the DMB Tx DSP 110.

Figure 2:
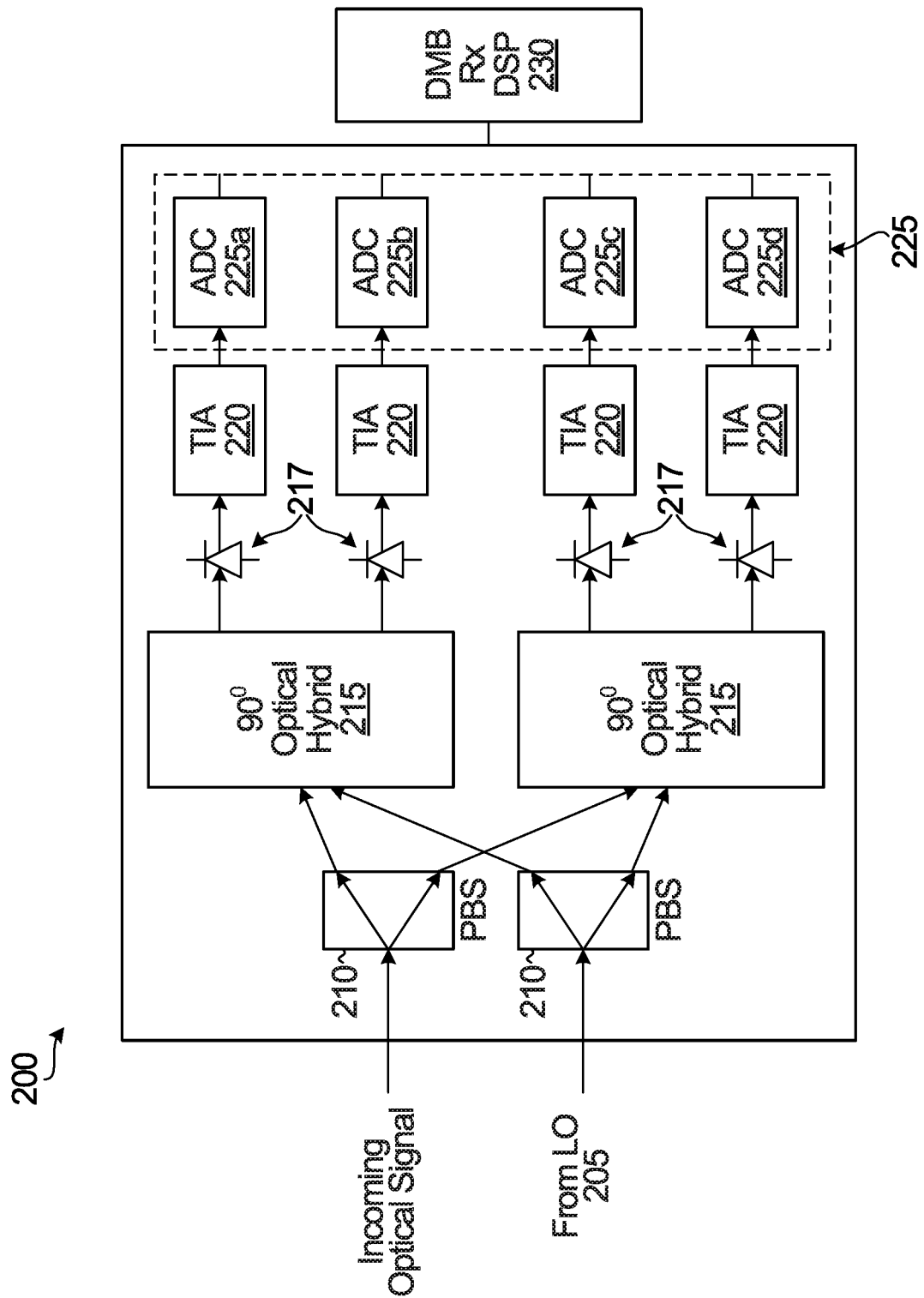
FIG. 2 is a block diagram of a coherent optical receiver of an optical communication system.

FIG. 2 is an example of a coherent optical receiver 200. The coherent optical receiver 200 includes polarization beam-splitters 210 that respectively split the received optical signal and a reference optical signal from local oscillator (LO) 205 into X and Y polarizations. 90° optical hybrids 215, followed by photodetectors 217 to process the output of the polarization beam-splitters 210 and convert the optical signals into electrical signals thereby providing in-phase (I) and quadrature-phase (Q) components for each of the mutually orthogonal received polarizations. Four transimpedance amplifiers 220 each respectively amplify the I and Q components of each polarization prior to analog-to-digital conversion. The ADCs 225a to 225d in Quad-ADC 225 may each act as a sampler that periodically samples its input analog electrical signal. The output of the quad ADC is provided to a DMB receiver digital signal processing (DSP) unit 230.

The DSP unit 230 may comprise a receiver filter, a demodulator for soft demodulation, and an equalization module. The equalization module may include a frequency domain equalizer (FDEQ), a time domain equalizer TDEQ) or both. The FDEQ may be used for mitigating impairments such as CD, while the TDEQ may be used for mitigating impairments such as PMD, SOP and PDL The demodulator and the equalization module digitally compensate channel impairments and/or component impairments. Examples of additional impairments that the demodulator and the equalization module may be used to mitigate include, but are not limited to laser phase noise, jitter, frequency offset, I-Q delay, X-Y delay, and I-Q imbalance. The output of the equalization module is provided to a FEC decoder which may use an iterative decoding approach to decode the encoded bits.

Receiver DSP unit 230 may include separate modules for compensating specific impairments. For example, even within the FDEQ or the TDEQ, there may be separate modules for mitigating particular impairments.

The DMB Rx DSP 230 may be implemented by a processor that executes instructions that cause the processor to perform the operations of the DMB Rx DSP 230. Alternatively, the DMB Rx DSP 230 may be implemented using dedicated integrated circuitry, such as an application specific integrated circuit (ASIC), a graphics processing unit (GPU), or a programmed field programmable gate array (FPGA) for performing the functions of the DMB Rx DSP 230.

Aspects of the present disclosure are directed in part to the receiver DSP unit and in particular the equalization module. The equalization module includes a trellis-based equalization module that may utilize multiple trellis-based processors (TBP) that can be individually adaptively configured for performing a trellis-based equalization to compensate a residual Inter-Symbol Interference (ISI) and a trellis-based equalization to compensate a residual Phase Noise (PN). ISI is an example of an additive impairment and PN is an example of a multiplicative impairment that communication systems, particularly high speed transmission systems such as coherent optical systems, can suffer from. The effects of such impairments can be exacerbated when Higher Order Modulation (HOM) formats, such as, but not limited to, 8, 16, 32, or 64 quadrature amplitude modulation (QAM) or Quadrature Phase Shift Keying (QPSK) modulation, are used.

For some types of communication systems, an effective way to increase the spectral efficiency is to use HOM formats, which allow transmission at a higher data rate while using a same bandwidth as a lower order modulation, or transmit with the same data rate as a lower order modulation, but using a reduced effective bandwidth. However, use of HOM formats may cause the transmitted signals to be more susceptible to both ISI and PN.

Although some embodiments described herein make reference to optical systems and particularly coherent optical systems, it should be understood that the described methods and apparatuses are generally applicable to any communication systems. For the purpose of this disclosure, the expression "digital signal processing apparatus" is used to encompass all Digital Signal Processors (DSPs), digital signal processing devices, circuits, implementations, units, modules, means, whether implemented in hardware, software and/or firmware. A digital signal processing apparatus may comprise an Application Specific Integrated Circuit (ASIC), a Field-Programmable Gate Array (FPGA), or can be an off-the-shelf Digital Signal Processing (DSP) chip. In accordance with some embodiments of the description, the digital processing apparatus is considered an optical DSP.

Bandwidth limitations of components, such as bandlimited opto-electronic devices, can often cause ISI in the transmitted signal. Such an impairment can result in a significant correlative additive noise in the received signal.

Components in the transmitter and receiver and the channel itself can also introduce PN, resulting in a significant correlative multiplicative noise in the received signal.

For example, uncompensated Local Oscillator (LO) Frequency Offsets (FO) can be a significant source of PN. In coherent optical systems, laser linewidth (LW) and fiber non-linearity can cause phase noise that deteriorates system performance. The phase stability of a laser is inversely proportional to its linewidth. Similarly, for various wireless systems such as microwave Point-To-Point (PTP) systems as well advanced cellular access systems that often use HOM, PN can be a serious impediment. Phase Locked Loops (PLLs) can be used to align the phases of the received signals. Specifically, Decision Directed-PLL (DD-PLL) has been a popular technique to ensure that the system is phase locked with the phase of the transmitted signal and also remove any inadvertent PN that may have been introduced by the channel. However, in a PN sensitive system, the DD-PLL usually is unable to have a high bandwidth and at the same time maintain overall PLL stability. This results in some residual PN that can be detrimental to system performance. Moreover, due to the nature of the impairments the residual PN is often correlated over several symbols. Therefore, methods for effective compensation of residual PN in communication systems, particularly high speed transmission systems, would be beneficial.

Since compensation for both ISI and PN may require computationally intensive techniques, it is challenging to implement solutions for both types of compensation separately with limited hardware resources and to meet the criteria for power consumption, silicon area and the like. As well, existing ISI compensation methods cannot be easily adopted for PN compensation, particularly for transmission systems at speeds on the order of tens to hundreds of Gigahertz (GHz) or more.

While FIGS. 1 and 2 illustrate a transmitter and receiver in a coherent communication system that may create additive and multiplicative impairments, there are other physical elements in the communication system that may also introduce additive and multiplicative impairments. In coherent long haul communication systems with higher data rate transmission, optical signals frequently traverse through Wavelength Selective Switches (WSS) and/or Reconfigurable Optical Add-Drop Multiplexers (ROADMs) that effectively filter the transmitted signal. This type of filtering typically incurs a penalty at a receiver that limits the reach of the signal. Also, for higher system margin, it may be desirable to transmit the signal with a higher launch power. However, an optical signal transmitted with a higher launch power may suffer further penalty due to non-linear system impairments.

It is also desirable in Nyquist based Wavelength Divisional Multiplexing (WDM) systems to further enhance spectral efficiency by employing negligible spacing amongst the channels. This can lead to enhanced crosstalk amongst the channels.

Figure 3:
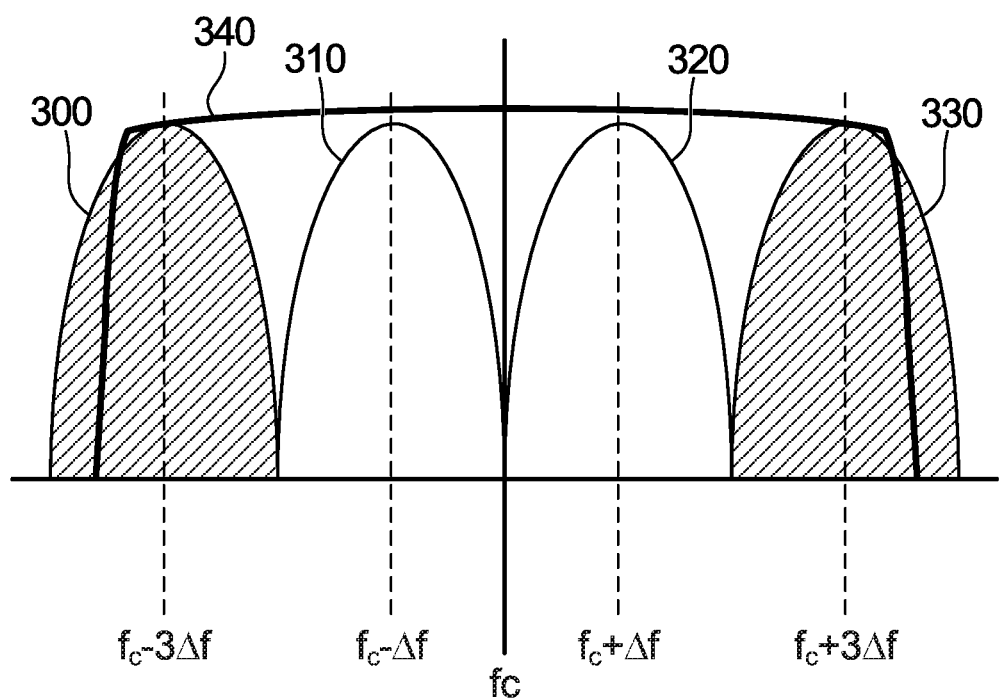
FIG. 3 is a diagram illustrating system filtering effects that are being mitigated according to aspects of the disclosure.

A digital sub-carrier multiplexed transmission includes several signals, in respective frequency bands, that have been multiplexed together. Each of the signals resides within a fixed frequency band and the several signals together have an overall bandwidth. FIG. 3 illustrates an example of a digital sub-carrier multiplexed signal having four distinct frequency bands 300, 310, 320 and 330. The four bands are multiplexed on a carrier frequency $f_c$. The center frequency of frequency band 320 is located at $fc+\Delta f$, where $\Delta f=BW/2$, BW being the bandwidth of the frequency bands. The center frequencies of frequency bands 300, 310, and 330 are located at $fc-3\Delta f$, $fc-\Delta f$ and $fc+3\Delta f$, respectively. Frequency bands 300 and 330 are located at the outside edge of the digital sub-carrier multiplexed signal and will be referred to as edge frequency bands. Frequency bands 310 and 320 are located away from the edge of the digital sub-carrier multiplexed signal and will be referred to as inner frequency bands. In the digital sub-carrier multiplexed transmission, frequency bands on the respective outside edges are in general more susceptible to a) interference due to close spacing from Nyquist WDM and b) limitation of bandwidth of optical network elements causing a bandpass filtering effect. Reference character 340 denotes a filtering effect imposed on the four frequency bands 300, 310, 320 and 330 that may possibly result from a cascade of fixed bandwidth WSSs. As can be seen in FIG. 3, at least a portion of edge frequency bands 300 and 330 are cut-off by the bandwidth filtering effect 340.

Digital sub-carrier multiplexed transmission provides flexibility of data rates by the use of techniques such as: a)

different modulation and/or Forward Error Correction (FEC) rates for different frequency bands b) rate variability through sub-carrier bandwidth variation; and c) transmission bandwidth granularity by increasing or decreasing a number of frequency bands being transmitted in a given overall bandwidth. Implementing one or more of these techniques may aid in providing a longer reach for the transmission and a greater tolerance to impairments due to fiber non-linearity.

A multiplexed signal transmitted by the transmitter propagates through fiber-optic links and passes through several Network Elements (NEs) in the communication system that each has a limited bandwidth. FIG. 3 illustrates how cascading of multiple bandwidth limiting network elements may affect the filtering of the digital sub-carrier multiplexed signal composed of the four distinct bands. The relatively narrow bandwidth of such NEs causes impairment in the signal content of edge bands of a given bandwidth due to the signal being attenuated. Such filtering causes ISI in the received signal that degrades BER of the edge tones. In some embodiments, this type of system effect filtering may affect the modulation used for signals in the edge frequency bands of the bandwidth to be, for example, QPSK modulation, which has a spectral efficiency of 2 bits/symbol.

Two ways to reduce the impact of such filtering is to: a) use lower order modulation as this will have relatively less of an impact on BER as compared to higher order modulation; and b) use trellis based equalization on the received signal prior to symbol decoding as this may provide nearly optimal ISI mitigation.

Frequency-Domain Hybrid QAM (FDHQ) transmission is an example of a digital sub-carrier multiplexed transmission. In FDHQ transmission, for a group of frequency bands, signals on inner frequency bands are transmitted with a higher modulation rate than a modulation rate used for signals transmitted on edge frequency bands to achieve an overall higher spectral efficiency modulation. The inner frequency bands may use a higher order modulation than the signals of the edge frequency bands, the inner frequency bands may be more susceptible to PN impairments. Furthermore, the use of lower order modulation for signals on the edge frequency bands may aid in reducing the effects of system filtering that occurs on the transmitted signal.

There are multiple sources of PN in optical systems. One source is from fiber non-linearity. While fiber non-linearity includes both addition and multiplicative impairments, in communication systems that implement compensation of the optical links, the multiplicative impairment is the dominant impairment one form of which is PN.

Figure 4A:
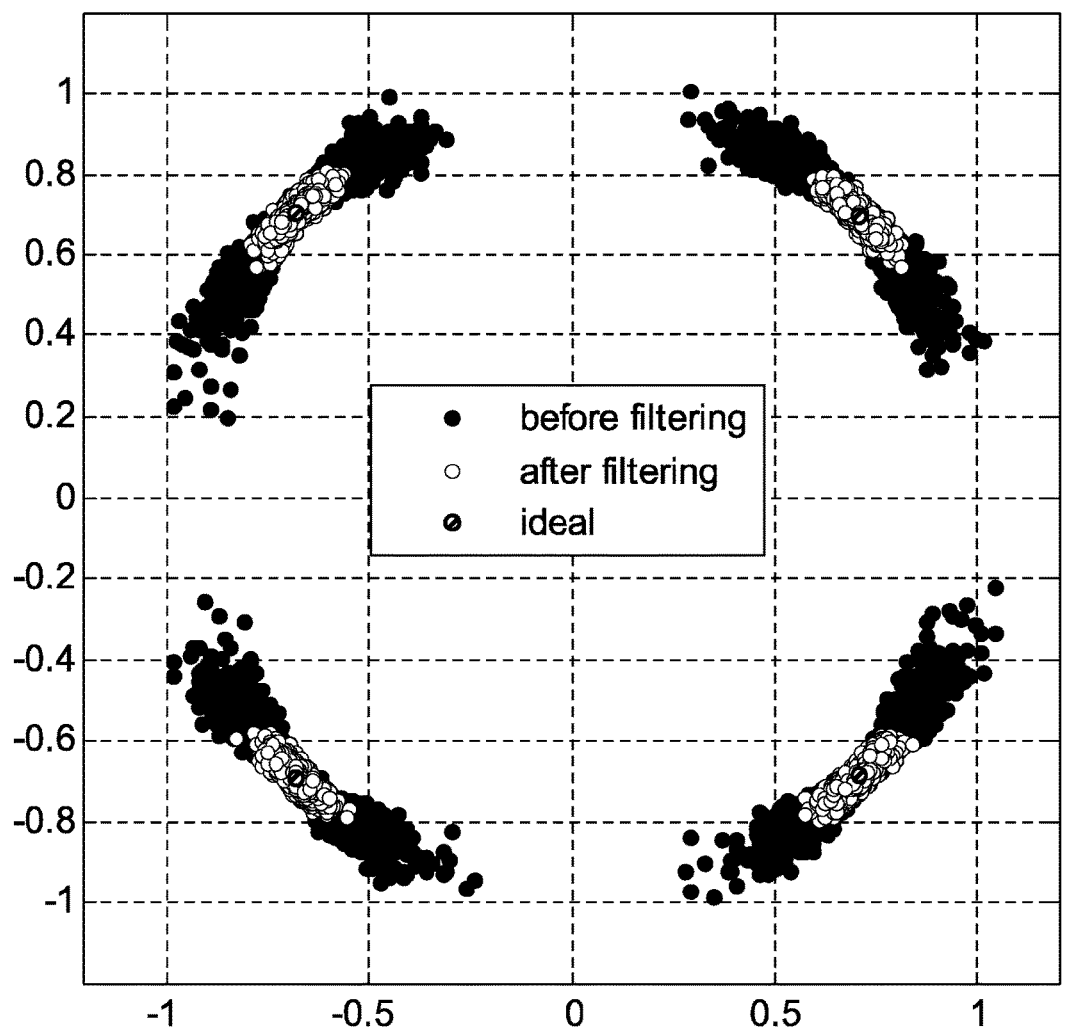
FIG. 4A is an example of a simulated received QPSK constellation illustrating how transmission spread resulted from non-linear phase noise can be removed according to an aspect of the disclosure.

FIG. 4A illustrates a computer implemented model of how non-linear phase noise effects a received QPSK signal being transmitted in 90% compensated LEAFT optical fiber. The model is based on looG transmission rate with cross phase modulation (XPM) with 11G channels co-propagated for 10 spans of optical fiber whereby each span is 80 kilometers. FIG. 4A shows the scattered range of the received symbols before PN compensation, the more closely defined range of the received symbols after using a PN compensation and the ideal symbols points, as a single point in each of the four quadrants.

Figure 4B:
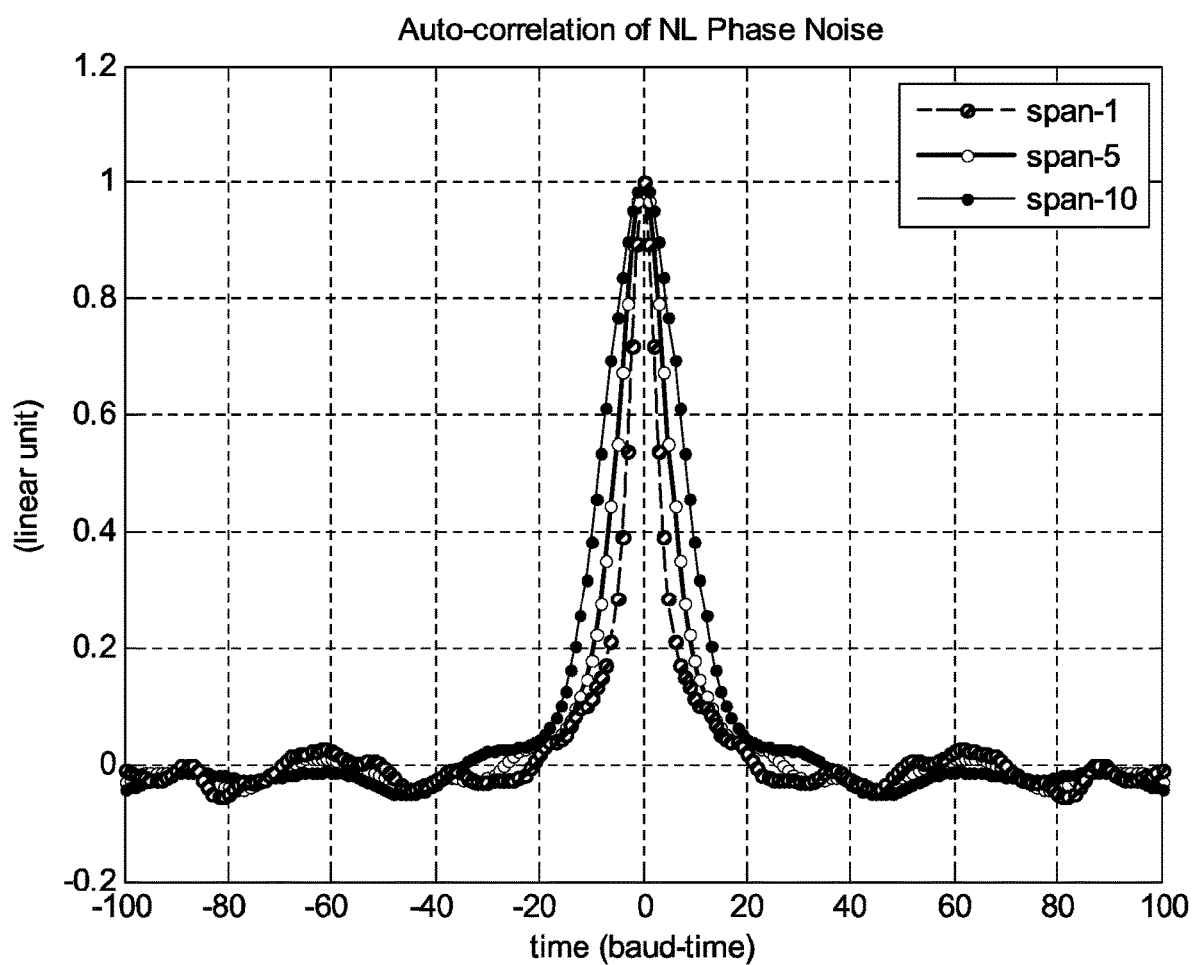
FIG. 4B is a plot showing autocorrelation of non-linear phase noise for a simulated QPSK modulated signal over different transmission lengths.

FIG. 4B illustrates a computer implemented model of autocorrelation of non-linear phase noise for three different lengths (spans) of optical fiber. The model is based on a QPSK signal being transmitted in 90% compensated LEAF™ optical fiber having a looG transmission rate with cross phase modulation (XPM) from 11G neighbor channels. A first autocorrelation result is modelled based on a fixed length (span-1). A second autocorrelation result is modelled based on five times the fixed length (span-5). A third autocorrelation result is modelled based on 10 times the fixed length (span-10). It can be seen that correlation of the non-linear phase noise increases with fiber length, As such, compensation of PN for higher order modulation using a trellis-based approach may aid the receiver in detecting symbols with less error.

Inner frequency bands do not tend to suffer from the effect of the system filtering in the same way as the edge frequency bands do as shown in FIG. 3, and therefore a higher order modulation can be used for the inner bands. An advantage of this may be an increase in the overall spectral efficiency. For example, with respect to the four frequency band scenario described above in FIG. 3, the two edge frequency bands may use QPSK having a spectral efficiency of 2 bits/symbol and the two inner frequency bands may use 16 QAM having a spectral efficiency of 4 bits/symbol. The resulting spectral efficiency of the transmission on the four frequency bands is (2+4+4+2)/4=3 bits/symbol. In comparison, if 8 QAM was used for all four frequency bands for the same spectral efficiency of the transmission, the system filtering effect would be increased on the edge bands.

While QPSK and 16 QAM are used as particular examples of lower order and higher order modulation, other forms of modulation are also considered.

More generally, aspects of the present application may provide the use of one or more of a) different modulations based on frequency band position, b) minimization of system filtering effects on transmitted signal by using lower order modulation on edge frequency bands c) trellis based processing to further minimize effect of narrow filtering on edge frequency bands and d) trellis based processing to reduce impact of phase noise caused, for example, due to non-linearity of optical channel for higher order modulations.

Trellis based processing involves constructing a trellis structure that is based on a residual value, be that a residual ISI component for ISI mitigation or a residual PN component for PN mitigation. The trellis structure includes L trellis stages and N states corresponding to N possible values of symbols or phases. Trellis based processing involves traversing the L trellis stages to identify a most likely residual value that can then be compensated. The trellis structure may be navigated using a Viterbi or BCJR algorithm. The BCJR algorithm, named for inventors Bahl, Cocke, Jelinek and Raviv, is an algorithm for maximum a posteriori decoding of effort correcting codes.

When attempting to mitigate ISI that spans multiple symbols, symbol-by-symbol processing may be sub-optimal and therefore result in performance loss. Similarly, when there is PN memory in a channel, symbol-by-symbol phase recovery can lead to performance loss, thereby penalizing signals that use HOM even more. Processing a block of data from a respective frequency band of the DMB signal in parallel as multiple smaller blocks of data can be implemented using multiple trellis based processors as will be discussed below.

Figure 5:
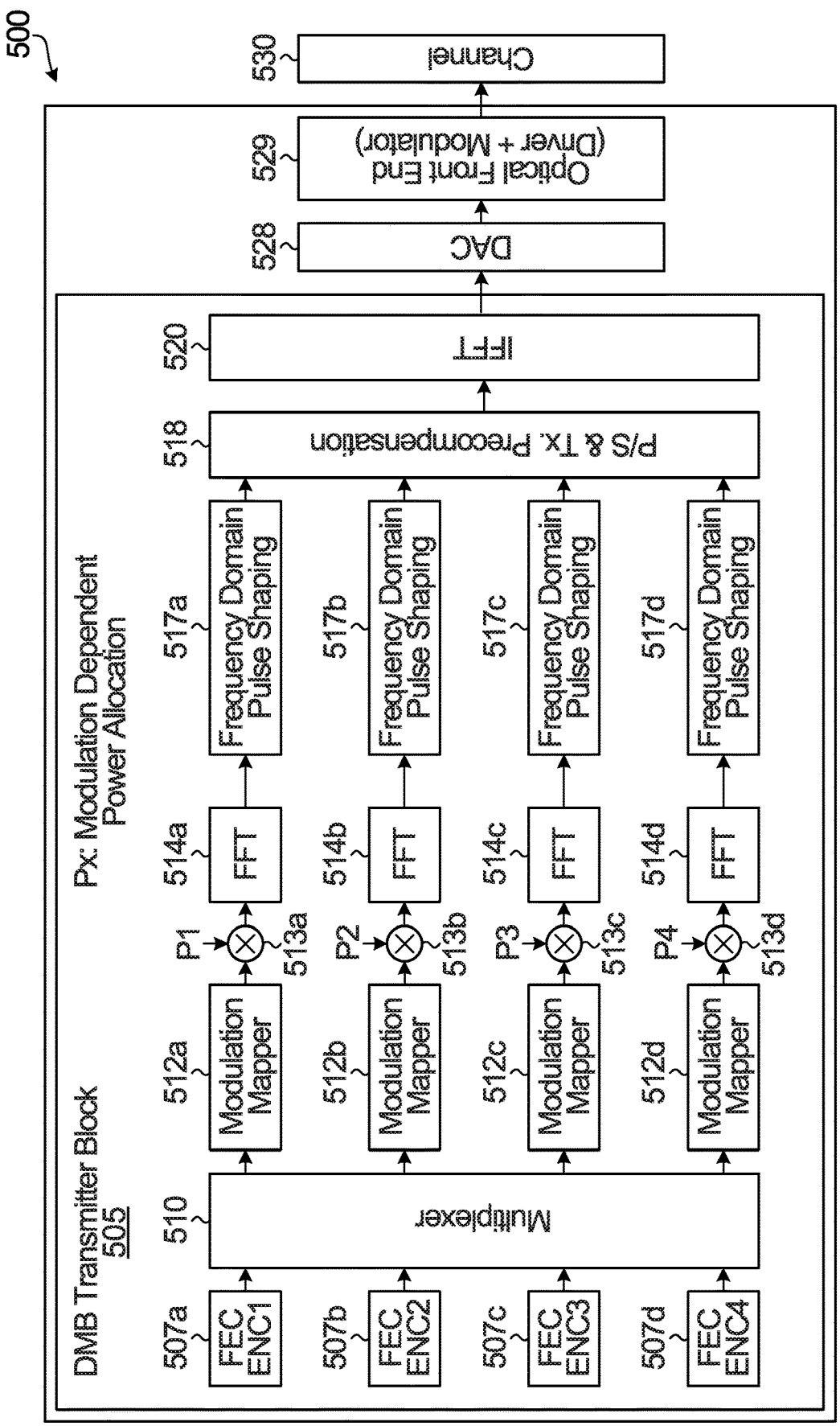
FIG. 5 is a block diagram of a Digital Multi-Band (DMB) transmitter according to an aspect of the disclosure.

FIG. 5 shows an example of a Digital Multi-Band (DMB) transmitter 500 according to an embodiment provided in the application. The DMB transmitter 500 is generally consistent with the transmitter shown in FIG. 1. The DMB transmitter DSP unit 110 according to an aspect of the present disclosure is shown in further detail in FIG. 5 as DMB transmitter DSP unit 505. The transmitter DAC 115 corresponds to DAC 528 and the Optical Front End 529 corresponds to the laser 125, Mach-Zehnder modulators 120a and 120b and PBC 135 from FIG. 1.

DMB transmitter DSP unit 505 receives four respective digital bit streams. Each of the four independent bit streams is applied to one of four FEC encoders 507*a*, 507*b*, 507*c* and 507*d*. Outputs of the four FEC encoders 507*a*, 507*b*, 507*c*, 507*d* are input to multiplexer 510. The multiplexer 510 groups $M_k$ bits of the bit streams together into symbols, where $M_k=\log_2(C_k)$ and is the number of bits per symbol to be mapped to a constellation with $C_k$ elements that will be transmitted on the k-th band of the multi-band signal. The bits may or may not have one-to-correspondence with the outputs of the k-th FEC depending on how the multiplexer 510 arranges the bits.

The symbols output of the multiplexer 510 are input to four modulation mappers 512*a*, 512*b*, 512*c* and 512*d* that map the symbols according to the particular modulation type being used for a given band. The power of the mapped symbols output from the four modulation mappers 512*a*, 512*b*, 512*c* and 512*d* is controlled by modulation type dependent multipliers 513*a*, 513*b*, 513*c* and 513*d*. The modulation type dependent multipliers 513*a*, 513*b*, 513*c* and 513*d* adjust the power of each mapped symbol by applying a scalar adjustment value P1, P2, P3 and P4, respectively. The power adjustment that is applied is based on a desired error performance of each band. For example, as described above the higher order modulation used for the inner bands may use higher power for the symbols compared to the edge bands. The power controlled outputs of 513*a*, 513*b*, 513*c* and 513*d* are each provided to a respective FFT 514*a*, 514*b*, 514*c* and 514*d* and then conditioned by pulse shaping modules 517*a*, 517*b*, 517*c* and 517*d* in the frequency domain. Outputs from the frequency domain pulse shaping modules 517*a*, 517*b*, 517*c* and 517*d* are input to the P/S converter and transmission pre-compensation module 518.

The parallel-to-serial conversion in the P/S converter 518 includes translating the bands such that they do not overlap one another. Once the bands have been translated, IFFT module 518 performs an IFFT with the IFFT module 518 having an FFT size that is greater than the bands that are being transmitted. The signal resulting from the IFFT module 518 forms a single signal that is used to modulate the optical carrier.

Each band may be independently encoded with individual FEC rates using the FEC encoders 507*a*, 507*b*, 507*c*, 507*d* with rate adaptation for each band. Some embodiments may use the same FEC for all tones and therefore individual band rate adaptation may not possible. Some embodiments may use a same FEC for at least one group of tones and other tones may have separate FECs, or one or more other tones could be grouped together with a different FEC.

A different modulation type may be applied to each band depending on a highest target spectral efficiency for that band. In some embodiments, power allocation may be optimized for each modulation type such that all tones may have similar Bit Error Rates (BER) despite use of different modulation types. In some embodiments, power allocation may be optimized for each modulation type such that one or more tones may have different pre-defined BER requirement.

While a four frequency band multi-band is described with regard to the transmitter above, it is to be understood that this should not limit the scope of the application. The multi-band could have more or less than four frequency bands within the overall frequency span of the transmitted signal, which is greater than or equal to the sum of the frequency spans of individual bands.

The optical channel 530 is configured to transport the multiplexed signal from the transmitter 500 to a receiver, and may comprise fibers, optical filters, optical amplifiers, WSSs and ROADMs. The components of the optical channel 530 can introduce undesired signal changes, resulting from CD, nonlinear phase noise, PMD, PDL and/or gain, SOP rotation, optical additive noise, optical multiplicative noise, or combinations thereof.

Figure 6:
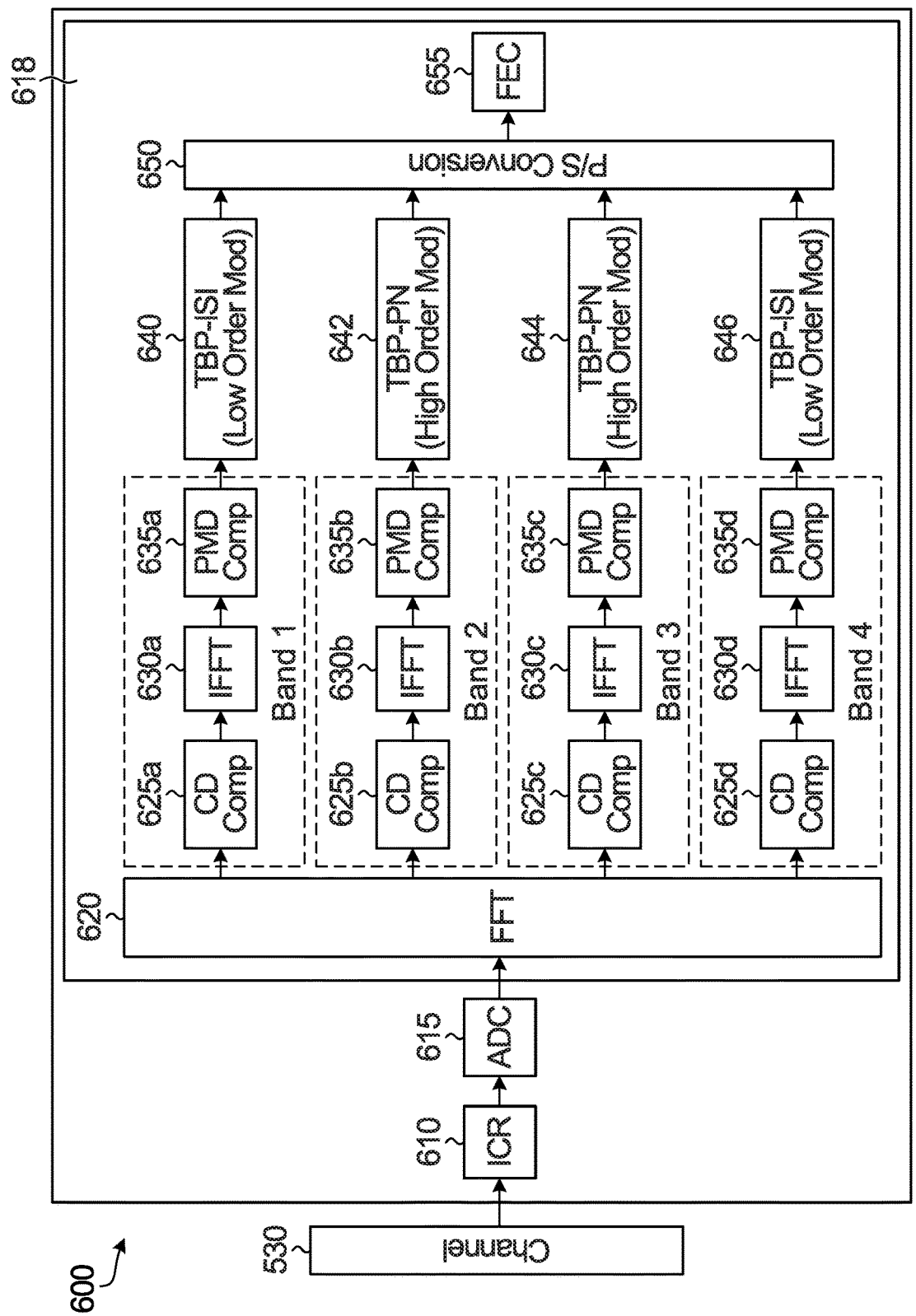
FIG. 6 is a block diagram of a DMB receiver according to an aspect of the disclosure.

FIG. 6 illustrates an example of a coherent optical receiver according to an embodiment of the application. The DMB receiver 600 is generally consistent with the receiver shown in FIG. 2. The DMB receiver DSP unit 230 is shown according to an aspect of the present disclosure in further detail in FIG. 6 as DMB receiver DSP unit 618. An integrated coherent receiver (ICR) 610 corresponds to the LO 205, PBSs 210, 90° Optical Hybrid 215 and TIAs 217 from FIG. 2 and the Quad ADC 225 (225*a*, 225*b*, 225*c*, and 225*d*) corresponds to ADC 615. The ICR 620 may also be referred to as a coherent detector. The receiver 600 is configured to receive the DMB signal from channel 530. For the sake of example, the received signal is considered to consist of a signal as illustrated in FIG. 3. As such, DMB receiver DSP unit 618 uses an FFT module 620 to recover signals in the four frequency bands. The FFT module 620 may be considered a digital demultiplexer for demultiplexing the DMB signal into respective digital signals. The ADC 615 converts the analog outputs from the ICR 610 to the digital domain. The output of the ADC 615 is provided to the FFT module 620, which converts the digital signals into the frequency domain. As shown in FIG. 2, the ADC 615 may be implemented as four separate ADCs that output respective signals to the FFT module 620. The output of the FFT module 620 enables each of the frequency bands to be processed individually. The signal of each band is processed to compensate for CD and PMD using a CD compensation module 625*a*, 625*b*, 625*c*, 625*d* and a combination of IFFT module 630*a*, 630*b*, 5630*c* and 630*d* and PMD compensation module 635*a*, 635*b*, 635*c* and 635*d*.

There is also a Trellis Based Processor (TBP) 100 aid in mitigating at least ISI or Phase Noise for each band. In FIG. 6, TBPs 640 and 646 process signals of the edge frequency bands and TBP 642 and 644 process signals on the inner frequency bands.

TBPs 640 and 646 are configured to process the signals in an attempt to mitigate ISI. In the example of FIG. 6, TBPs 640 and 646 process signals that have been modulated with a lower order modulation, which may include QPSK. TBPs 642 and 644 are configured to process the signals in an attempt to mitigate residual PN. In the example of FIG. 6, TBPs 642 and 644 process signals that have been modulated with a higher order modulation, which may include M-ary QAM, where M equals 16 or more.

Outputs from the four TBPs 640, 642, 644 and 646 are input to a Parallel-to-Serial (P/S) conversion module 650. The P/S conversion module 650 operates in a manner that is substantially different to the P/S module 518 in the transmitter 500 in that it groups the symbols for the different frequency bands into a single stream of data. An output from the P/S conversion module 650 is input to a FEC decoder 655. In some implementations there are a number of FEC decoders that are equal to the number of bands, i.e. each band is processed by a respective FEC decoder. In some implementations the number of FEC decoders is less than the total number of bands, i.e. one or more bands each have a separate FEC decoder and two or more bands use a same common FEC decoder.

The TBPs are designed to maintain a similar core trellis structure that allows a given TBP to be configured to either compensate for ISI or PN. Individual TBP design is made agnostic to impairments that may be experienced by the transmitted signal in the system.

The DSP unit 618 may be implemented by a processor that executes instructions that cause the processor to perform the operations of the DSP unit 618. Alternatively, the DSP unit 618 may be implemented using dedicated integrated circuitry, such as an application specific integrated circuit (ASIC), a graphics processing unit (GPU), or a programmed field programmable gate array (FPGA) for performing the functions of the DSP unit 618.

Figure 7:
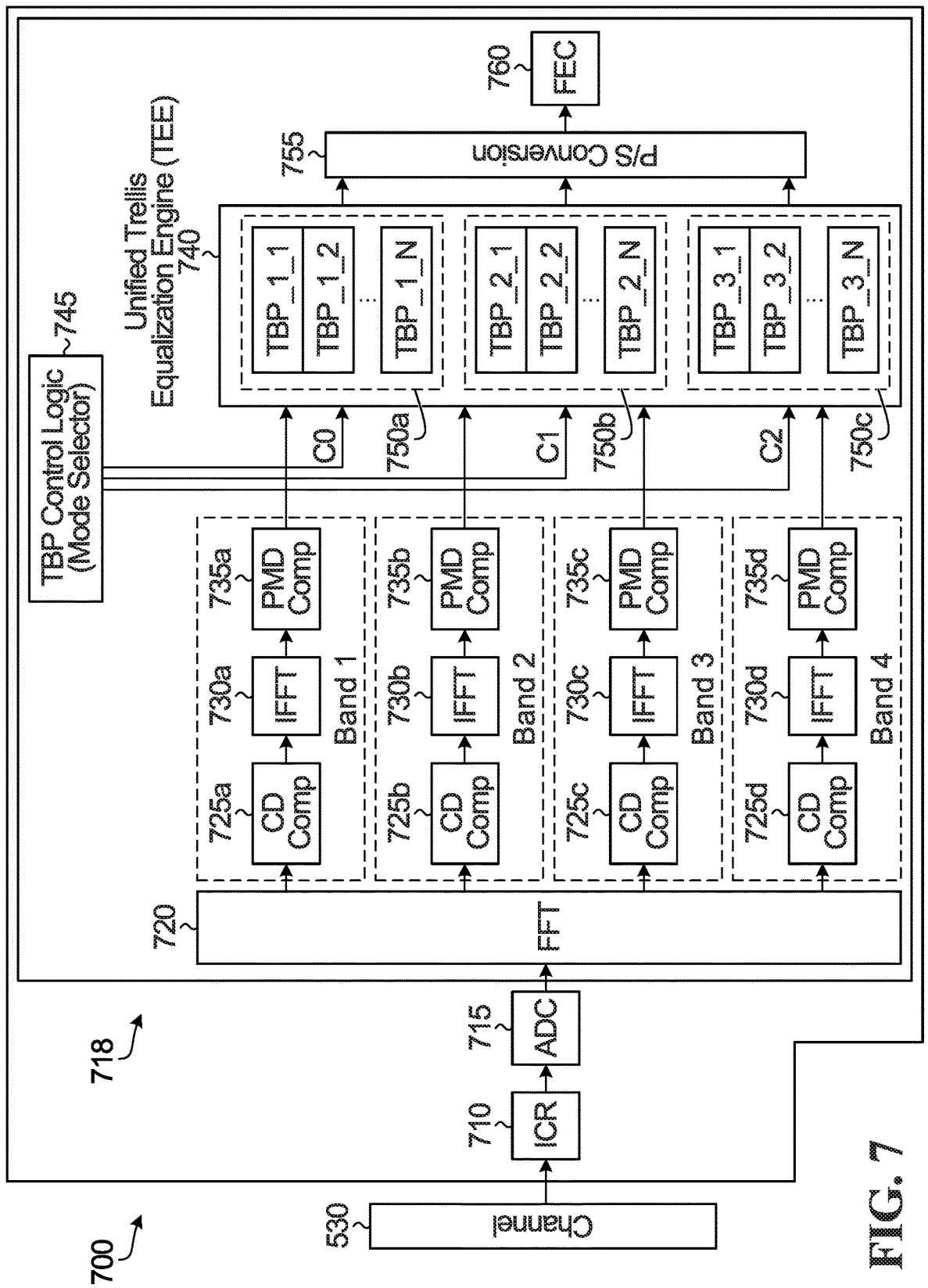
FIG. 7 is a block diagram of a DMB receiver according to another aspect of the disclosure.

FIG. 7 illustrates an alternate embodiment of a receiver 700 using TBPs. In FIG. 7, instead of having dedicated TBPs for processing signals in edge frequency bands and inner frequency bands as is shown in FIG. 6, the receiver DSP unit 718 has a collection of TBPs that can be adaptively configured to process the signals received at the receiver 700. The receiver 700 includes similar elements to FIG. 6 in the form of ICR 710 and ADC 715. The receiver DSP unit 718 includes FFT 720, CD compensation modules 725a, 725b, 725c and 725d, IFFT modules 730a, 730b, 730c and 730d, and PMD compensation modules 735a, 735b, 735c and 735d. Outputs of PMD compensation modules 735a, 735b, 735c and 735d are input to a Unified Trellis Equalization Engine (TEE) 7400. The TEE 740 is comprised of three groups of multiple TBPs. A first group 750a includes N TBPs (TBP 1_1, TBP 1_2, . . . , TBP 1_N). A second group 750b includes N TBPs (TBP 2_1, TBP 2_2, . . . , TBP 2_N). A third group 750c includes N TBPs (TBP 3_1, TBP 3_2, . . . , TBP 3_N).

It is not necessary to have a direct 1:1 mapping between a group of multiple TBPs and a specific band of the multi-band signal. In the example of FIG. 7 there are three groups of multiple TBPs and four frequency bands.

A TBP control logic mode selector 745 is also included in the receiver 700. The TBP control logic mode selector 745 configures each of the TBPs in each of the groups of TBPs so that the TBP can perform a desired processing operation. The TBP control logic mode selector 745 is used to initialize each TBP in the groups of TBPs based on the frequency band(s) that the group of TBPs will be processing. Each frequency band may utilize up to N TBPs of a group of N TBPs to process the signal of the frequency band. All TBPs allocated for a given frequency band are set to a same operating mode.

While a four frequency band multi-band is described with regard to the receiver above, it is to be understood that this should not limit the scope of the application. The multi-band could have more or less than four frequency bands in the multi-band. Furthermore, in the example of FIG. 7, the TEE 740 has three groups of N TBPs for the four frequency band example. The number of groups may be larger or smaller than three groups and there is no direct relationship between the number of frequency bands, the number of groups of TBPs or the number of TBPs in each group. In some embodiments, there may be a maximum number of groups of TBPs, the maximum number of groups including one group for mitigating PN and multiple groups for mitigating ISI, each group of the multiple groups for mitigating ISI in a respective band.

The DSP unit 718 may be implemented by a processor that executes instructions that cause the processor to perform the operations of the DSP unit 718. Alternatively, the DSP unit 718 may be implemented using dedicated integrated circuitry, such as an application specific integrated circuit (ASIC), a graphics processing unit (GPU), or a programmed field programmable gate array (FPGA) for performing the functions of the DSP unit 718.

In FIGS. 6 and 7 CD and PMD compensation elements are illustrated. This is an example of how CD and PMD compensation could be performed, but other implementations would be possible, for example PMD compensation could make use of a frequency domain adaptive filter which would no longer necessitate the use of an IFFT prior to the PMD compensation.

Figure 8:
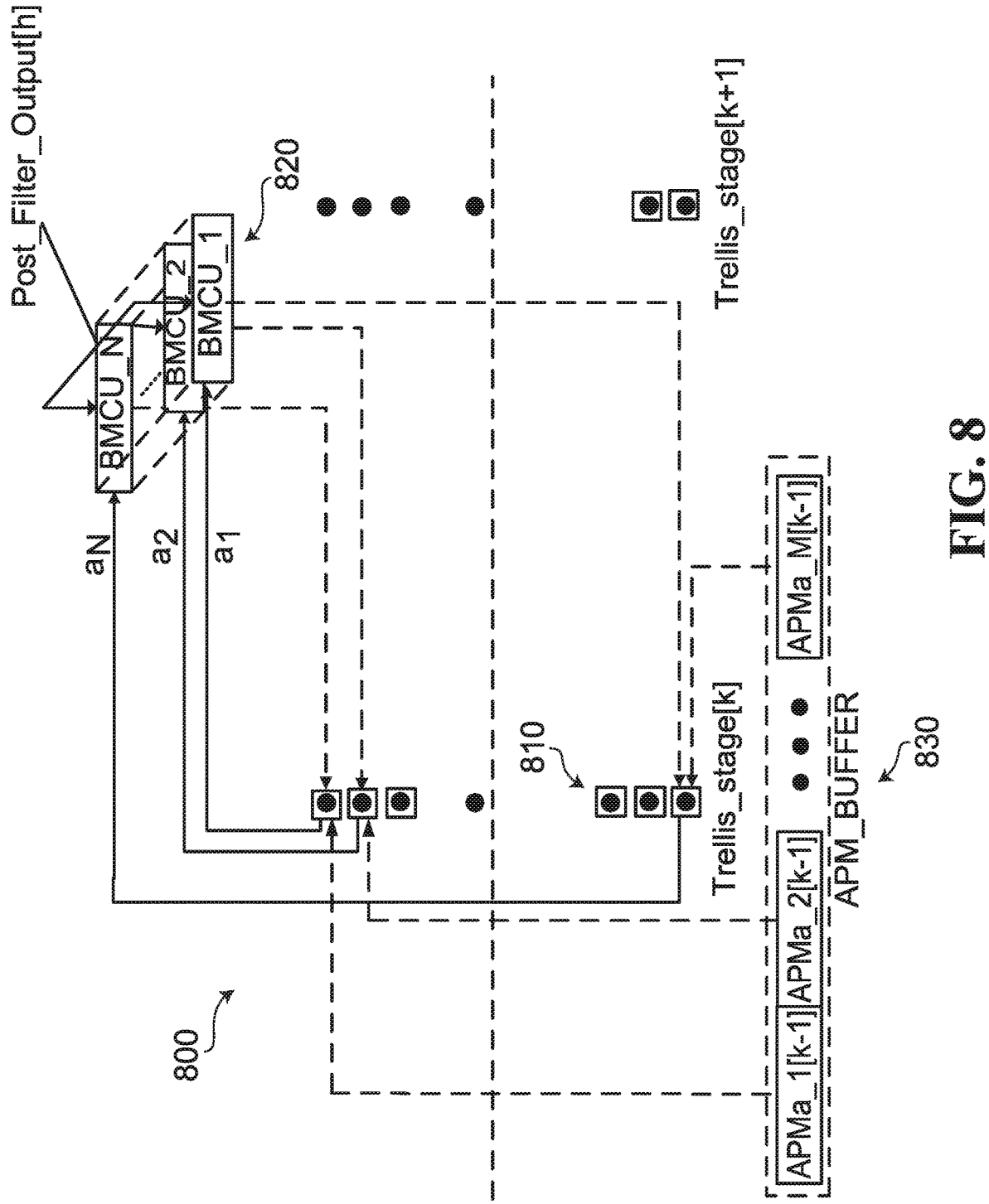
FIG. 8 is a schematic diagram of an embodiment of a trellis-based equalization engine in an inter-symbol interference mitigation mode.
Figure 9:
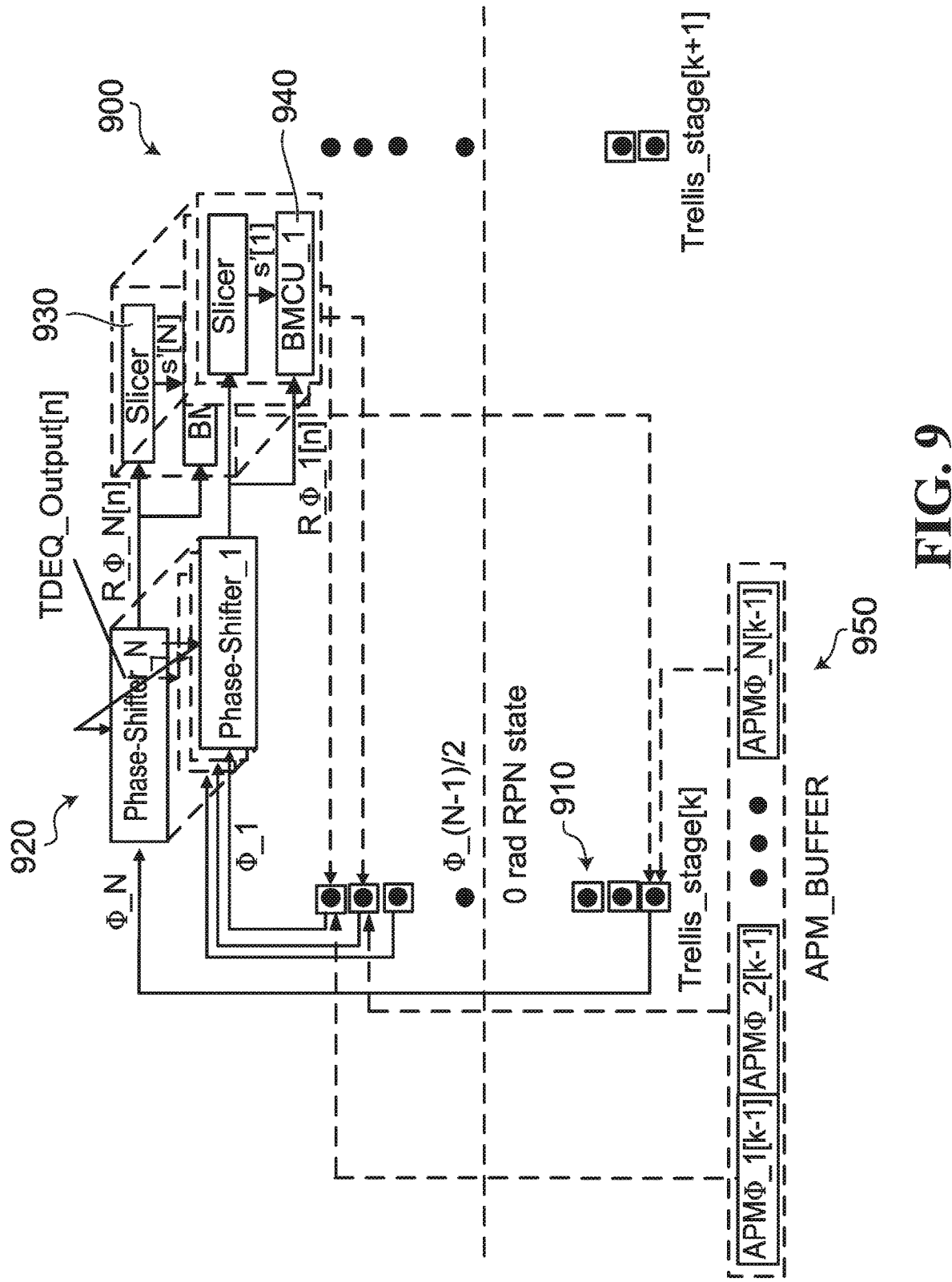
FIG. 9 is a schematic diagram of an embodiment of a trellis-based equalization engine in a phase noise mitigation mode.

FIGS. 8 and 9 described below are examples of how the TBP may be configured to operate in the ISI mitigation mode (FIG. 8) and in the PN mitigation mode (FIG. 9).

FIG. 8 provides a schematic diagram of an embodiment of the TBP 800 in the ISI mitigation mode.

When the channel is primarily affected by ISI (correlative additive noise), the received signal $y_k$ of symbol k may be represented in the following form, assuming adequate symbol synchronization has been established, $$y_k = x_k + n_k + I_k \quad (1)$$

where, $x_k$ represents the transmitted symbol k, $n_k$ represents the non-correlative additive noise, and $I_k$ represents the effective ISI. Depending on the channel, either or both of post-cursor and pre-cursor ISI may be encountered. In this particular embodiment, only the pre-cursor ISI is considered by assuming a given symbol is affected only from energies of symbols that have been received prior to it. It should, however, be understood that the design can be applied to also take into consideration the post-cursor ISI.

In the ISI mitigation mode, the residual ISI can be discretized into M possible combinations of previous symbols with suitable weighting factors for each previous symbol.

In the ISI mitigation mode, a channel memory of M (e.g., M=2 or 3) symbols is considered. The trellis structure is comprised of N states (e.g., N=16), where each state in the trellis represents a possible weighted sum of a current symbol and at least one previous symbol. The weighted sum can be obtained by summing the real or imaginary parts of the symbols separately or by summing the complex values of the symbols. Under certain conditions, such as in case when rectangular constellations are used, the operation may be in a low phase noise regime. In such a case, I and Q independence can be assumed and the branch metric can be simplified by separating the real and imaginary parts of the symbols. In other cases, the Euclidean distance metric is a complex number calculation. Based on the calculated branch metrics, the TBP 800 is configured to navigate through the trellis structure to compensate the residual ISI of the coarse carrier compensated signal.

The operation of TBP 800 in the ISI mitigation mode is explained with reference to FIG. 8. Each node 810 represents a state. The signal is filtered by a post-filter (not shown in this figure) with a same number of filter taps as an amount of channel memory that is modeled and the post-filtered signal Post_Filter_Output[n] is input to the branch metric calculation units (BMCU) 820 BMCU_1, . . . , BMCU_N. There are N BMCUs corresponding to N states of the trellis. The weighted sums $\alpha_1, \ldots, \alpha_N$ of symbols corresponding to the N states are sent to their respective BMCUs 820 BMCU_1, . . . , BMCU_N. Each BMCU 820 obtains a Euclidean distance metric between the post-filtered signal Post_Filter_Output[n] and a corresponding possible weighted sum $\alpha_1, \ldots \alpha_N$. The weights may be determined through a conventional channel estimator employing pilots or by other suitable methods.

For each trellis stage k, state metrics of the previous trellis stage k−1 are buffered in accumulative path metric (APM) units 830 APMa_1[k−1], ..., APMa_N[k−1]. Both the state metrics of the previous trellis stage k−1 and the branch metrics of the current trellis stage k obtained by the BMCUs 820 are used to calculate the state metrics of stage k. A reduced set of states may be used to propagate from a trellis stage to a next trellis stage. The trellis structure used in the TBP 900 includes L trellis stages, referred to as the trace back length of the trellis.

Based on the calculated branch metrics, state metrics of the states may be calculated recursively using the principles of the Viterbi algorithm.

FIG. 9 provides a schematic diagram of an embodiment of TBP 900 in the PN mitigation mode.

When the channel is primarily affected by phase noise, the received signal $y_k$ of the symbol k can be represented in the following form, assuming adequate symbol synchronization has been established, $$y_k = x_k e^{(j\theta_k)} + n_k \qquad (2)$$

where, $x_k$ represents the transmitted symbol k, $n_k$ represents the non-correlative additive noise, and $\theta_k$ is the phase noise.

In the PN mitigation mode, the residual PN $\phi_k$ in the range of $[\phi_{min}, \phi_{max}]$ can be discretized into N states. Each state of the trellis structure represents a possible residual phase noise of a symbol. The possible residual phase noise corresponding to a state can be referred to simply as the residual phase state. The residual phase noise jump in each discrete time is quantized to a number of levels (e.g., 3 levels), each represented by a branch. That is, the phase noise at each discrete time is assumed to be one of the three quantized levels added to the phase of the previous discrete time. Accordingly, a branch in the trellis structure of the PN mitigation mode represents a possible phase noise jump at a discrete time (or alternatively, in a trellis stage) and connects from a source state to a destination state. The possible phase noise jump corresponding to the branch can be referred to simply as the phase jump.

The maximum and minimum residual PN value may be symmetric around zero, i.e., the residual PN can be either positive or negative. The phase state values may be distributed uniformly or non-uniformly.

With reference to FIG. 9, each node 910 represents a state, more particularly in the context of the PN mitigation mode, a residual phase state. In the PN mitigation mode, for each state $\Phi\_1, \ldots, \Phi\_N$ in the trellis, the output of the a time domain equalizer TDEQ_Output[n](which may be an output from the PMD component 435a in FIG. 6, for example, that would be provided to TBP 900) is rotated according to the phase state $\Phi\_1, \ldots, \Phi\_N$, by, for example, a corresponding phase-shifter (or alternatively, phase-rotator) 920 phase-shifter_1, ..., phase-shifter_N. The rotated version R_Φ_1 [n], ..., R_Φ_N[n] of the output of the time domain equalizer is mapped to a corresponding constellation point (e.g., the closest constellation point) for a given modulation, employed in the transmission system. The mapping can be done by a corresponding slicer 930 s'[1], ..., s'[N]. Thereafter, a branch metric is calculated in each of the BMCU 940 BMCU_1, ..., BMCU_N, based on the Euclidean distance metric between the rotated version R_[n], ..., R_AN[n] of the output of the time domain equalizer and the mapped constellation point, as well as a probability of the phase jump.

Similar as in the ISI mitigation mode, for each trellis stage k, state metrics of the previous trellis stage k−1 are buffered in the APM units 950 APMΦ_1[k−1], ..., APMΦ_N[k−1].

Both the state metrics of the previous trellis stage k−1 and the branch metrics of the current trellis stage k obtained by the BMCUs 940 are used for the calculation of the state metrics of stage k. A reduced set of states may be used to propagate from a trellis stage to a next trellis stage. The trellis structure used in the TBP 900 also includes L trellis stages, with the same trace-back length as in the ISI mitigation mode.

Based on the calculated branch metrics, state metrics of the states may be calculated recursively using the principles of the Viterbi algorithm in the same manner as in the ISI mode.

Figure 10:
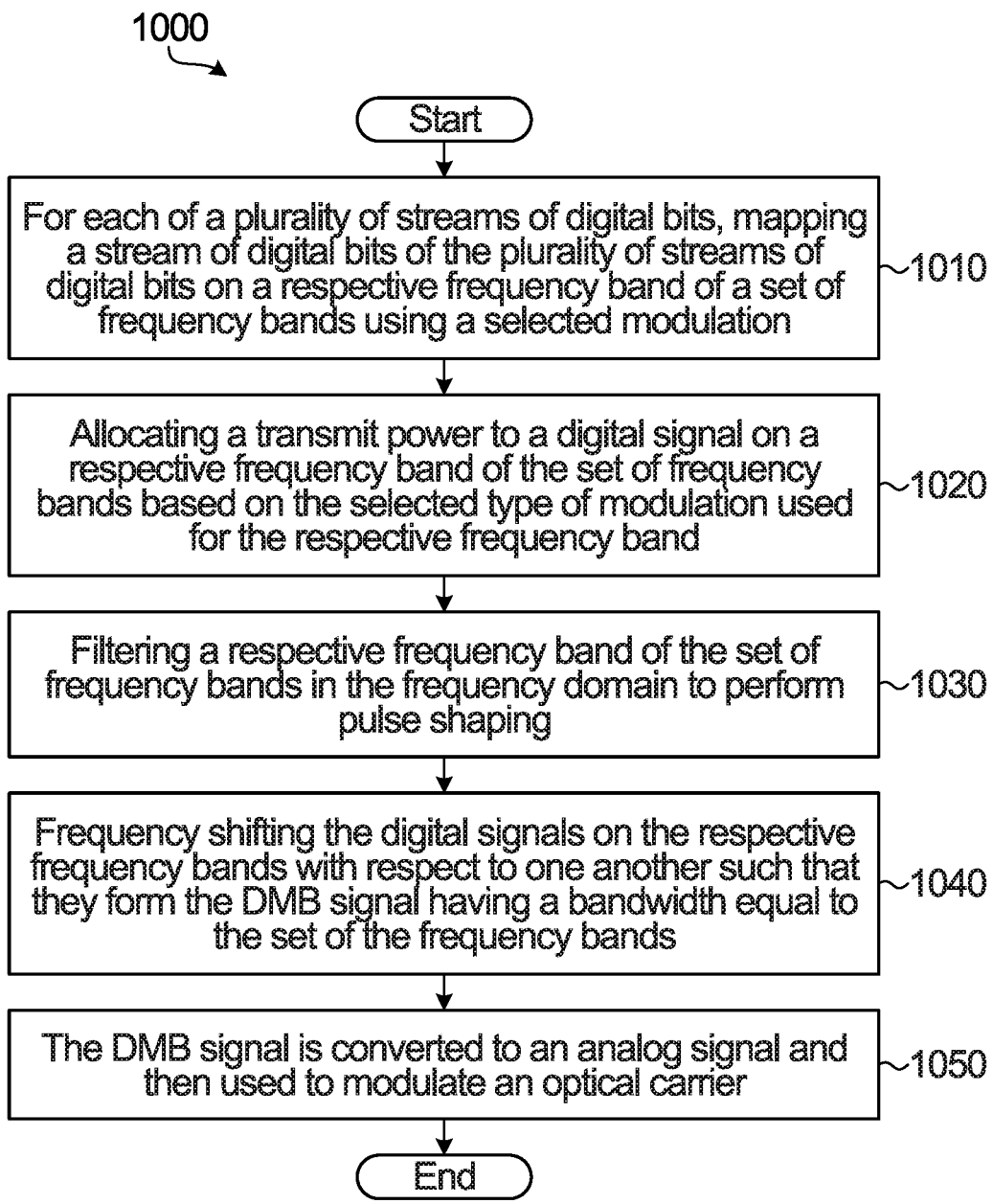
FIG. 10 is a flow chart describing a method for transmitting a DMB signal according to an aspect of the disclosure.

FIG. 10 is a flow chart 1000 describing a method for processing a digital multi-band (DMB) transmission for transmission by a coherent optical transmitter. In step 1010, the method involves for each of a plurality of streams of digital bits, mapping a stream of digital bits of the plurality of streams of digital bits on a respective frequency band of a set of frequency bands using a selected modulation. The mapping of each stream of digital bits can occur independently of each other. This may include providing each stream of digital bits of the plurality of bits to a FEC encoder and then using a multiplexer to multiplex the digital bits output from the FEC encoders into separate streams corresponding to each band. The multiplexed bit streams are then provided to a respective modulation mapper of a plurality of modulation mappers, wherein the number of modulation mappers is equal to the number of frequency bands in the set of frequency bands of the multi-band signal. In step 1020 the method involves allocating a transmit power to a digital signal on a respective frequency band of the set of frequency bands based on the selected type of modulation used for the respective frequency band. Allocating the transmit power to each respective digital signal can occur independently of each other. In step 1030, filtering is performed in the frequency domain for a respective frequency band of the set of frequency bands to perform pulse shaping.

In step 1040 the digital signals on the respective frequency bands are frequency shifted with respect to one another such that they form the DMB signal having a bandwidth equal to the sum of set of the frequency bands. Following the creation of the DMB signal in step 1050, the DMB signal is converted to an analog signal and then used to modulate an optical carrier. The DMB optical signal is then transmitted on the optical channel.

In some embodiments, mapping the stream of bits of the plurality of streams of bits using the selected modulation involves selecting a modulation based on the location of the frequency band in the set of frequency bands.

In some embodiments, mapping the stream of bits of the plurality of streams of bits using the selected modulation involves selecting a lower order modulation for mapping a signal on a frequency band that is at an edge of the set of frequency bands.

In some embodiments, mapping the stream of bits of the plurality of streams of bits using the selected modulation involves selecting a higher order modulation for mapping a signal on a frequency band that is between opposite edge frequency bands of the set of frequency bands.

Figure 11:
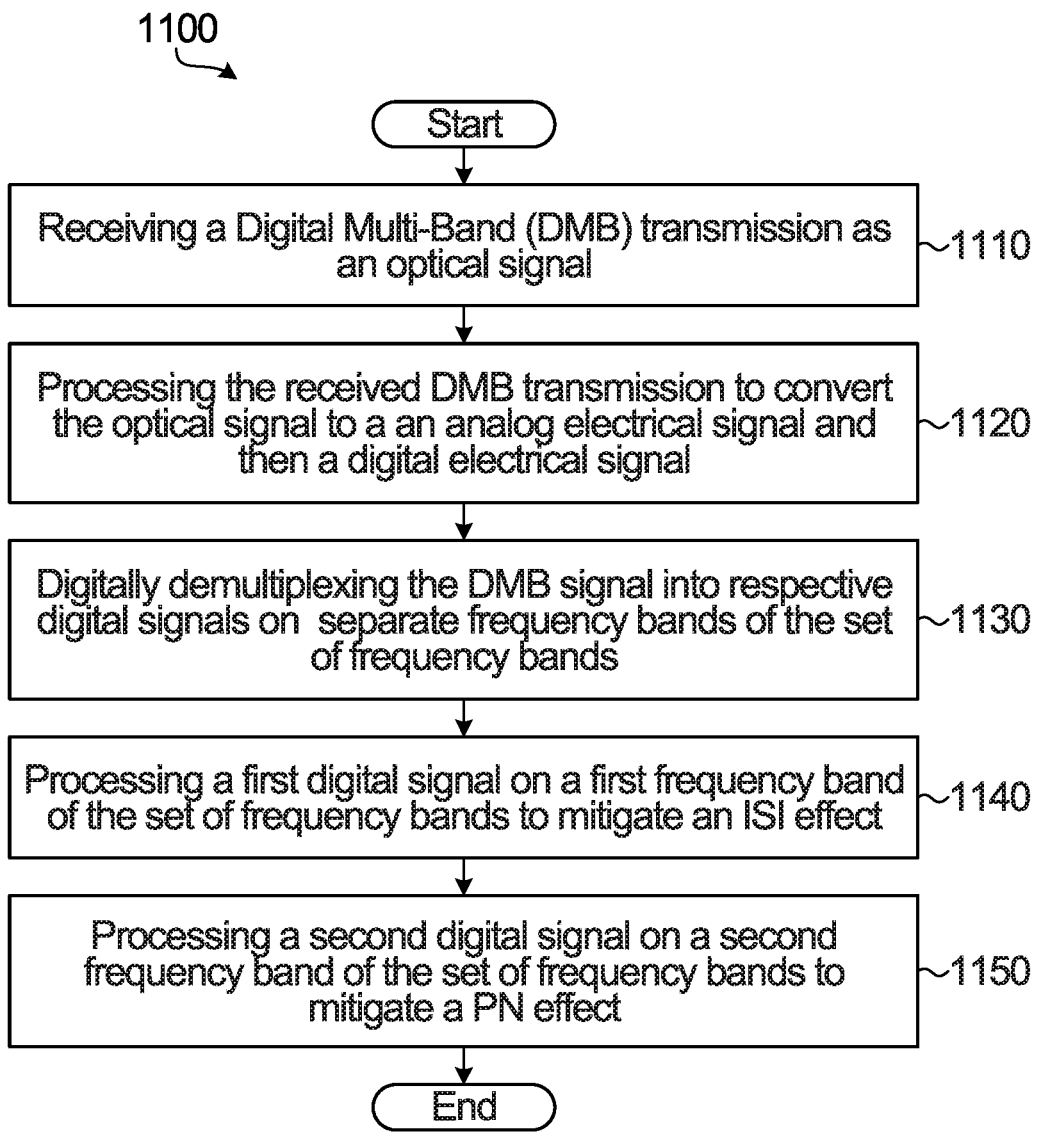
FIG. 11 is flow chart describing a method for receiving a DMB signal according to an aspect of the disclosure.

FIG. 11 is a flow chart 1100 describing a method for processing an optical DMB transmission received by a coherent optical receiver. At step 1110, the method involves receiving the DMB transmission as an optical signal. The DMB transmission includes streams of symbols that have been multiplexed on a set of adjacent frequency bands and used to modulate a single carrier frequency. Once the DMB transmission is received, a further step 1120 involves the optical signal undergoing some initial processing that may include converting the optical signal to an analog electrical signal and then converting the analog electrical signal into a digital signal. In some implementations this may correspond to using the ICR 610 and ADC 615 illustrated in FIG. 6. At step 1130 the method involves digitally demultiplexing the DMB signal into respective digital signals on separate frequency bands of the set of frequency bands This may be performed using an FFT to convert the signal to the frequency domain. Various forms of equalization may be performed on the digital signals of the respective frequency bands to compensate for impairments such as CD and PMD. At step 1130, the method involves processing a digital signal on a first frequency band of the set of frequency bands to mitigate an ISI effect. At step 1140, the method involves processing a digital signal on a second frequency band of the set of frequency bands to mitigate a PN effect.

In some embodiments, processing at least one digital signal on at least one frequency band of the first set of frequency bands to mitigate the ISI effect and processing at least one digital signal on at least one frequency band of the second set of frequency bands to mitigate the PN effect involves using one or more of a plurality of TBPs to mitigate the ISI effect or PN effect. Each TBP is configurable to mitigate either the ISI effect or PN effect.

In some embodiments, the method may further involve configuring one or more of the TBPs to process the digital signal on a respective frequency band to mitigate the ISI effect or the PN effect on the digital signal on the respective frequency band.

In some embodiments, processing at least one digital signal on at least one frequency band of the first set of frequency bands to mitigate the ISI effect_involves mitigating the ISI effect on the at least one digital signal on the at least one frequency band that is at least one edge frequency band of the set of frequency bands.

In some embodiments, processing at least one digital signal on at least one frequency band of the second set of frequency bands to mitigate the PN effect_involves mitigating the PN effect on at least one signal on at least one digital frequency band between frequency bands of the opposite edges of the set of frequency.

Simulations have been performed for an example of the DMB transmission receiving processes described herein. As a result of the simulation the following table illustrates a Required Optical Signal Noise Ratio (ROSNR) improvement in decibels (dB) in the presence of a simulated network having a baud rate (fBaud) of 45.85 GHz and including 8 WSS network elements between the transmitter and receiver and for 8 WSS network elements and using the TBP-ISI module in the receiver as described above.

| Modulation | 8QAM - All bands | DMB QPSK|16QAM|16QAM|QPSK |
|---|---|---|
| fBaud | 45.85 G | 45.85 G |
| 8 WSS | 18.71 dB | 16.95 dB |
| 8WSS + TBP-ISI | 17.86 dB | 16.76 dB |

The table below shows the ROSNR penalty reduction in dB by increasing the laser linewidth from 0 to 500 kHz.

| Penalty in dB | 8QAM - All bands | QPSK|16QAM|16QAM|QPSK |
|---|---|---|
| Without TBP-PN | 0.43 dB | 0.74 dB |
| With TBP-PN | 0.24 dB | 0.43 dB |

When compared to high baud rate single carrier transmission, aspects of the present application may provide a greater robustness to effects of optical filtering inherent in the system.

Higher CD tolerance and PMD tolerance may also be possible according to some aspects of the present application due to a longer symbol period of each frequency band. This may extend the reach of the signal transmission.

When compared to time-domain hybrid QAM (TDHQ), aspects of the present application may be advantageous due to little or no overhead for synchronization of modulation change that is needed for TDHQ but not FDHQ.

Aspects of the present application may more easily adapt to future flex-grid based transmission due to the flexibility in the carrier transmission.

Implementation of aspects of the present application may allow negligible change in front-end optoelectronics of an optical receiver. This may be beneficial so as to allow at least some of existing hardware to be maintained, thus reducing the cost of implementing aspects of the present application with existing infrastructure.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method for digitally processing an optical digital multi-band (DMB) signal comprising a set of frequency bands on a single carrier, the method comprising:
   digitally demultiplexing the DMB signal into respective digital signals on separate frequency bands of the set of frequency bands;
   processing a first digital signal on a first edge frequency band of the set of frequency bands to mitigate inter-symbol interference (ISI); and
   processing a second digital signal on a second inner frequency band of the set of frequency bands to mitigate phase noise (PN).

2. The method of claim 1, wherein processing the first and second digital signals on the first and second frequency bands is performed using a plurality of trellis based processors (TBPs), wherein each TBP is configurable to mitigate the ISI or the PN.

3. The method of claim 2 further comprising configuring one or more of the plurality of TBPs to process the first digital signal on the first frequency band to mitigate the ISI, or to process the second digital signal on the second frequency band to mitigate the PN.

4. The method of claim 3, further comprising configuring a first TBP of the plurality of TBPs to mitigate the ISI, wherein the processing comprises using the first TBP to mitigate the ISI.

5. The method of claim 3, further comprising configuring a second TBP of the plurality of TBPs to mitigate the PN, wherein the processing comprises using the second TBP to mitigate the PN.

6. The method of claim 2, wherein more than one of the plurality of TBPs are allocated to process a single digital signal on a single frequency band of the set of frequency bands.

7. A signal processor for digitally processing a digital multi-band (DMB) signal comprising a set of frequency bands on a single carrier, the signal processor comprising:
   a digital demultiplexer adapted to demultiplex the DMB signal into respective digital signals on separate frequency bands of the set of frequency bands;
   a plurality of trellis based processors (TBPs), each trellis based processor adaptively configurable for mitigating inter-symbol interference (ISI) or phase noise (PN) of the digital signals on one of the frequency bands; and
   a TBP mode selector adapted to:
      configure a first TBP of the plurality of TBPs to process the digital signal on a first edge frequency band of the set of frequency bands to mitigate the ISI; and
      configure a second TBP of the plurality of TBPs to process the digital signal on a second inner frequency band of the set of frequency bands to mitigate the PN.

8. The signal processor of claim 7, wherein the plurality of TBPs are configurable independently of one another.

9. The signal processor of claim 7, wherein each of the plurality of TBPs can process both lower order modulation signals and higher order modulation signals.

10. The signal processor of claim 7, wherein more than one of the plurality of TBPs are allocated to process a single digital signal on a single frequency band of the set of frequency bands.

11. A receiver for receiving an optical multi-band (DMB) signal, the receiver comprising:
   a coherent detector for detecting the optical DMB signal;
   an analog to digital converter for converting the optical DMB signal detected by the coherent detector into a digital DMB signal comprising a set of frequency bands on a single carrier;
   a digital demultiplexer for demultiplexing the DMB signal into respective digital signals on separate frequency bands of the set of frequency bands;
   a plurality of trellis based processors (TBPs), each trellis based processor adaptively configurable for mitigating inter-symbol interference (ISI) or phase noise (PN) of the digital signals on one of the frequency bands; and
   a TBP mode selector adapted to:
      configure a first TBP of the plurality of TBPs to process the digital signal on a first edge frequency band of the set of frequency bands to mitigate the ISI; and
      configure a second TBP of the plurality of TBPs to process the digital signal on a second inner frequency band of the set of frequency bands to mitigate the PN.

12. The receiver of claim 11, wherein the digital demultiplexer comprises a frequency transform module for separating the digital signals on the first and second frequency bands.

13. The receiver of claim 11, wherein the plurality of TBPs are configurable independently of one another.

14. The receiver of claim 11, wherein more than one of the plurality of TBPs are allocated to process a single digital signal on a single frequency band of the set of frequency bands.

15. A transmitter for transmitting an optical digital multi-band (DMB) signal, the transmitter comprising:
   a plurality of modulation mappers, each modulation mapper configured to transform a plurality of streams of bits into a frequency domain to provide corresponding digital signals on a set of frequency bands;
   a plurality of power allocators, each power allocator configured to allocate a transmit power to a digital signal on a corresponding frequency band of the set of frequency bands based on a modulation format of each stream of symbols;
   a plurality of frequency-domain pulse shaping filters, each frequency-domain pulse shaping filter configured to filter the digital signal on the corresponding frequency band of the set of frequency bands based on a modulation format of each stream of symbols;
   a converter configured to transform the digital signals on each frequency band of the set of frequency bands, filtered by the plurality of frequency-domain pulse shaping filters, into a time-domain serial signal; and
   an integrated coherent optical front end configured to transmit the time-domain serial signal as an optical signal.

16. The transmitter of claim 15, wherein the plurality of frequency-domain pulse shaping filters are configured to frequency shift the digital signals on the corresponding frequency bands with respect to one another to form a digital DMB signal having a bandwidth equal to a sum of the set of frequency bands.

17. The signal processor of claim 7, wherein the plurality of TBPs are configurable independently of one another.

18. The signal processor of claim 7, wherein more than one of the plurality of TBPs are allocated to process a single digital signal on a single frequency band of the set of frequency bands.

19. The receiver of claim 11, wherein each of the plurality of TBPs can process both lower order modulation signals and higher order modulation signals.

20. The receiver of claim 11, wherein more than one of the plurality of TBPs are allocated to process a single digital signal on a single frequency band of the set of frequency bands.

* * * * *